Patented Oct. 17, 1933

1,931,049

UNITED STATES PATENT OFFICE 1,931,049

PROCESS OF MAKING DIHYDROXY-FLUORANES

Paul B. Woods, James Ogilvie, and Frederick H. Kranz, Buffalo, N. Y., assignors to National Aniline & Chemical Company, Inc., New York, N. Y., a corporation of New York No Drawing. Application November 21, 1931
Serial No. 576,610

20 Claims. (Cl. 260—65)

This invention relates to the production of polyhydroxyfluoranes, and more particularly to improvements in their production by the condensation of an o-phthalic anhydride compound with a suitable polyhydroxybenzene compound having a free position ortho to one of the hydroxyl groups. It relates specifically to improvements in the manufacture of fluorescein by the condensation of o-phthalic anhydride with resorcinol.

The production of polyhydroxyfluoranes is well known to the art by heating an o-phthalic anhydride compound with a suitable polyhydroxybenzene compound having a free position ortho to one of the hydroxyl groups in the presence or absence of a condensing agent. In carrying out the process in accordance with one usual method of procedure, suitable proportions of the phthalic anhydride compound and the polyhydroxybenzene compound are heated in a reaction vessel at the fusion temperature of the mixture until the condensation is complete. As ordinarily conducted, the reaction mixture sets to a final hard, infusible mass which is difficult to remove from the reaction kettle. The reaction ordinarily cannot be carried out to advantage at temperatures below the fusion point of the reaction mixture because stirring is necessary to provide a ready transfer of heat throughout the reaction mass so as to reduce local overheating, and at temperatures below the fusion point the mass sets and cannot be stirred. Since water is formed as a result of the condensation and boils off as the reaction proceeds, and since the composition of the reaction mass changes as the reaction proceeds, thereby raising the fusion point of the reaction mixture, it is necessary to increase the temperature of the reaction mixture as the condensation reaction progresses in order to maintain its fluidity. As a result of the high temperatures therefore employed, particularly toward the end of the reaction, local overheating occurs, resulting in the production of by-products and leading to low yields of a product of poor quality. The presence of the by-products in the desired product is furthermore objectionable inasmuch as their removal is troublesome and adds to the cost of the final product. It has been proposed to carry out the condensation at lower temperatures by including a condensing agent (as for example sulfuric acid or zinc chloride) in the reaction mixture, but this procedure is also objectionable for the reason that it results in a product of inferior quality owing to the secondary action of the condensing agent to produce by-products which are troublesome and expensive to remove from the desired product. Moreover, the initial cost of the condensing agents and the trouble and expense incidental to their removal from the product render their use disadvantageous.

An object of the present invention is to provide improvements in the method of making polyhydroxyfluoranes by condensing o-phthalic anhydride compounds with polyhydroxybenzene compounds containing a free position ortho to one of the hydroxyl groups whereby an increased yield of the polyhydroxyfluoranes is obtained. Another object of the invention is to provide improvements in the method of making polyhydroxyfluoranes by condensing o-phthalic anhydride compounds with polyhydroxybenzene compounds containing a free position ortho to one of the hydroxyl groups whereby products of improved quality are obtained. A further object of the invention is to provide improvements in the production of polyhydroxyfluoranes by the condensation ortho-phthalic anhydride compounds with polyhydroxybenzene compounds having a free position ortho to one of the hydroxyl groups whereby the condensation can be carried out in the absence of a condensing agent and at temperatures below the fusion point of the mixture of reacting ingredients. An additional object of the invention is to provide improvements in the condensation of o-phthalic anhydride with resorcinol whereby fluorescein of improved quality is obtained in increased yields.

Other objects of the invention will in part be obvious and will in part appear hereinafter.

It has now been found, according to the present invention, that improved results can be obtained in the production of polyhydroxyfluoranes by condensing the o-phthalic anhydride compound with the polyhydroxybenzene compound having a free position ortho to one of the hydroxyl groups in a reaction medium comprising an inert organic substance which is liquid under the conditions of the reaction, as an extender (that is, a solvent or diluent). The extender is preferably an inert organic liquid which is immiscible or only partially miscible with water and which has a relatively high boiling point (above 130° C.). It has been found, by carrying out the condensation with the aid of an inert organic liquid, and especially one which is relatively immiscible with water, that the yield and quality of the resulting polyhydroxyfluorane is increased, that the reaction mixture can be readily stirred throughout the entire reaction period, that local overheating is avoided, that the employment of a condensing agent is ordinarily not necessary, although one may be used if desired, and that the polyhydroxyfluorane is produced in a more or less finely divided crystalline state which forms with the organic liquid a slurry that can be readily removed from the reaction kettle.

The invention accordingly comprises the steps and the relation of each to others thereof which will be exemplified in the process hereinafter disclosed. The scope of the invention will be indicated in the claims.

In the practice of the present invention in accordance with one method of procedure, the o-phthalic anhydride compound and the polyhydroxybenzene compound to be condensed for the production of a polyhydroxyfluorane are mixed with an inert organic liquid which is to serve as an extender for the reaction mixture, and the mass is heated in a suitable reaction vessel at a suitable reaction temperature while being agitated. Water which forms as a result of the condensation is preferably allowed to distill off. After completion of the reaction, the polyhydroxyfluorane produced is separated from the reaction mass and recovered in any suitable manner.

The organic substance employed as an extender should be inert to the reacting ingredients and the products, under the conditions of the reaction. Preferably it should be immiscible with water; so that the water formed by the reaction may be removed by distillation; so that any of the organic extender which jointly distills with the water may be readily recovered merely by stratification and returned for reuse in the process; and so that residual organic extender, remaining after separation of the product, may be purified and recovered for reuse by steam distillation. Furthermore, it should be preferably a relatively good solvent for the reacting ingredients and a relatively poor solvent for the product so that the reaction may be facilitated. It should also desirably have a boiling point in the neighborhood of the preferred reaction temperature, and preferably should form with the reacting ingredients a mixture boiling at the preferred reaction temperature; so that said reaction temperature may be automatically maintained simply by boiling the mixture.

Among the organic extenders which may be employed in accordance with the invention, there may be mentioned, by way of example, the lower halogenated hydrocarbons of the benzene series (as for example, monochlorobenzene, the dichlorobenzenes, the trichloro-benzenes, monobrom-benzene, the dibrom-benzenes, monochloro-toluenes, the dichloro-toluenes, etc.), the higher boiling hydrocarbons of the benzene series (as for example, the xylenes, cumene, the cymenes, the diethyl-benzenes, the mesitylenes, etc.), the hydrocarbons of the naphthalene series (as for example, naphthalene, alpha-methyl-naphthalene, beta-methyl-naphthalene, 1.4-dimethyl-naphthalene, alpha-ethyl-naphthalene, etc.), the halogenated hydrocarbons of the naphthalene series (as for example, alpha-chloronaphthalene, etc.), the aliphatic hydrocarbons of high boiling point (as for example nonane, decane, etc.), hydroaromatic hydrocarbons and their derivatives (as for example, tetra-hydro-naphthalene, etc.), and the like. It will be noted that not only substances which are liquid at ordinary temperatures may be employed, but also substances which are solid at ordinary temperatures but which are liquid at the temperature of the reaction may be employed. The particular organic substance to be employed as an extender in any particular reaction will depend upon the reaction ingredients employed, the reaction temperature to be employed, etc. as will be evident to one skilled in the art.

The amount of organic substance to be employed as an extender in accordance with the present invention may be varied within considerable limits. Preferably such an amount should be used that, at the completion of the reaction, there will be sufficient of it present in the reaction mass to render the mass mobile and readily stirrable. An amount of organic extender in excess of this amount may be employed if desired; but too great an excess is preferably avoided, as it reduces the speed of the reaction and tends to decrease the yield. If desired, the total required amount of organic extender may be incorporated into the reaction mixture at the beginning of the reaction. In accordance with a preferred method of procedure, however, it may initially be mixed with the reacting ingredients in an amount not greatly in excess of that required to render the mass readily stirrable, and preferably also to dissolve the reacting ingredients, and, as the reaction progresses, additional organic extender may be added in order to replace that lost from the reaction mass by joint distillation with the water and in order to maintain the reaction mixture in a mobile condition. In this way, the time for completing the condensation is decreased.

The invention may be applied for the production of any of the polyhydroxyflouranes; for example, by the condensation of any suitable o-phthalic anhydride compound (as for example, ophthalic anhydride, dichlorophthalic anhydride, tetrachlorophthalic anhydride, etc.) with any suitable polyhydroxybenzene compound having a free position ortho to one of the hydroxy groups (as for example, resorcinol, pyrogallic acid, orcin, etc.). The invention is preferably employed for the production of dihydroxyfluoranes by the condensation of o-phthalic anhydride with meta-dihydroxybenzene compounds having a free position ortho to one of the hydroxyl groups, as for example, resorcinol, its homologues and derivatives, and it is especially of interest for the manufacture of fluorescein by the condensation of o-phthalic anhydride with resorcinol.

The o-phthalic anhydride compound and polyhydroxybenzene compound may be employed in any suitable proportions, preferably about one molecular proportion of the phthalic anhydride compound to two molecular proportions of the polyhydroxybenzene compound being the ratio used.

The polyhydroxyfluorane may be recovered from the reaction mixture in any suitable manner. Thus, when it is obtained in accordance with the preferred procedure as an insoluble precipitate in admixture with an inert organic liquid employed as an extender, it may be separated, as by filtration, and the separated polyhydroxyfluorane may be freed from residual liquid in any suitable way, as by washing with alcohol or other suitable liquid, or by steam distillation, etc.

The invention will be illustrated by the following specific examples, but it is to be understood that it is not limited to the details thereof and that changes may be made without departing from the scope of the invention. The parts are by weight.

*Example 1.*—110 parts of "solvent 74" (commercial orthodichloro-benzene) and 220 parts of resorcinol are heated to form a solution in an enamelled kettle equipped with an agitator, and 148 parts of phthalic anhydride are added. Then the temperature of the batch is slowly raised to about 180° to 185° C. where it is held until the reaction is completed, which requires about 30 hours. During this time, the water which is formed in the reaction is allowed to distill off. The fluorescein formed separates from the hot solution during the course of the reaction as a dark crystalline mass. 200 parts of "solvent 74" and a small quantity of alcohol are then added to the resulting mixture to render it more fluid, and the mass is stirred until it is uniformly disintegrated. It is then filtered, the filter cake is washed with alcohol until free of "solvent 74" and it is then dried. It may be further purified by extraction with alcohol.

*Example 2.*—482 parts of "solvent 74" (commercial dichloro-benzene) and 1060 parts of resorcinol are heated to form a solution in an enamelled kettle equipped with an agitator, and 868 parts of phthalic anhydride are added. The temperature of the batch is then raised to the boiling point of the mixture (185° to 190° C.), where it is held for 2 hours. The vapors evolved from the reaction mass are cooled sufficiently to condense the "solvent 74", which is returned to the reaction mixture while uncondensed water vapor is permitted to pass out through the condenser. 482 parts of "solvent 74" preheated to 100° C. (so as not to cool the reaction mass too low) are then introduced, and the refluxing of the batch is continued for 2 hours longer, after which another 482 parts of preheated "solvent 74" are added. Refluxing at about 185° to 190° C. is continued for a total of about 16 hours. Throughout the condensation the mass remains in a mobile state and can be readily agitated. When the reaction is substantially completed, the reaction mass is cooled to about 70° C. and filtered at this temperature. The filter cake is then transferred to a still and is steam distilled to remove the solvent. It is then washed with hot water until the filtrate is no longer acid to Congo red paper and is then dried.

In the above examples other organic extenders may be employed instead of the "solvent 74", as for example those hereinbefore mentioned, and especially the hydrocarbons of the aromatic and aliphatic series and their lower halogen derivatives having a boiling point not less than about 130° C., and preferably those having a boiling point of 165° to 195° C. although solvents having a boiling point above 195° C. may be employed. Also, solvents are preferred which dissolve the phthalic anhydride and resorcinol at the temperature of the condensation, but do not dissolve substantial amounts of the fluorescein. By employing a solvent in the condensation reaction in which the fluorescein is insoluble, the solvent acts as a flux to keep the reaction mass in a mobile state even in the final stages of the reaction. Furthermore, the condensation may be carried out at temperatures other than those given (as for example, temperatures above 130° C.), depending upon the boiling point of the reaction mixture which in turn will depend on the boiling point of the organic extender and the proportions of ingredients employed in the mixture. The condensation is preferably carried out at temperatures between 160° C. and 190° C., inasmuch as the yield of fluorescein tends to decrease at temperatures above 190° C. The more elevated of these temperatures (as for example, 185° to 190° C.) are preferred to the lower temperatures, inasmuch as the reaction requires a longer time for its completion at the lower temperatures.

Since, in carrying out the above process, changes may be made in the ingredients and conditions employed without departing from the scope of the invention, it is intended that all matter contained in the above description shall be interpreted as illustrative and not in a limiting sense, except as limited by the claims.

We claim:

1. In the production of a polyhydroxyfluorane by the condensation of an o-phthalic anhydride compound with a polyhydroxybenzene compound containing a free position ortho to one of the hydroxyl groups, the improvement which comprises carrying out the condensation in a reaction mixture containing an inert organic substance which is liquid at the temperature of the reaction as an extender.

2. In the production of a polyhydroxyfluorane by the condensation of an o-phthalic anhydride compound with a polyhydroxybenzene compound containing a free position ortho to one of the hydroxyl groups, the improvement which comprises carrying out the condensation in an inert organic substance which is liquid at the temperature of the reaction as an extender in an amount sufficient to render the reaction mixture stirrable throughout the entire reaction period.

3. In the production of a polyhydroxyfluorane by the condensation of an o-phthalic anhydride compound with a polyhydroxybenzene compound containing a free position ortho to one of the hydroxyl groups, the improvement which comprises carrying out the condensation in an inert organic liquid in which the phthalic anhydride compound and polyhydroxybenzene compound are soluble, but in which the hydroxyfluorane produced is substantially insoluble.

4. In the production of a polyhydroxyfluorane by the condensation of an o-phthalic anhydride compound with a polyhydroxybenzene compound containing a free position ortho to one of the hydroxyl groups, the improvement which comprises carrying out the condensation in an inert organic liquid immiscible with water in an amount sufficient to render the reaction mixture stirrable during the final portion of the reaction period.

5. In the production of a polyhydroxyfluorane by the condensation of an o-phthalic anhydride compound with a polyhydroxybenzene compound containing a free position ortho to one of the hydroxyl groups, the improvement which comprises removing water produced as a result of the condensation by distillation with a water-immiscible inert organic liquid.

6. In the production of a polyhydroxyfluorane by the condensation of an o-phthalic anhydride compound with a polyhydroxybenzene compound containing a free position ortho to one of the hydroxyl groups, the improvement which comprises carrying out the condensation in a reaction mixture containing an inert organic substance which is liquid at the temperature of the reaction having a boiling point not less than about 130° C. as an extender.

7. In the production of a polyhydroxyfluorane by the condensation of an o-phthalic anhydride compound with a polyhydroxybenzene compound containing a free position ortho to one of the hydroxyl groups, the improvement which comprises carrying out the condensation in an inert organic liquid having a boiling point not less than about 130° C., and selected from the group consisting of the hydrocarbons of the aromatic and aliphatic series and their halogen derivatives, in an amount sufficient to render the reaction mixture stirrable throughout the entire reaction period.

8. In the production of fluorescein by the condensation of o-phthalic anhydride with resorcinol, the improvement which comprises removing water produced as a result of the condensation by distillation with an inert organic liquid.

9. In the production of fluorescein by the condensation of o-phthalic anhydride with resorcinol, the improvement which comprises carrying out the condensation in an inert organic liquid in which the phthalic anhydride and resorcinol are soluble, but in which the fluorescein produced is substantially insoluble.

10. In the production of fluorescein by the condensation of o-phthalic anhydride with resorcinol, the improvement which comprises carrying out the condensation in an inert organic liquid immiscible with water in an amount sufficient to render the reaction mixture stirrable, and removing water produced as a result of the condensation by distillation with the organic liquid.

11. In the production of fluorescein by the condensation of o-phthalic anhydride with resorcinol, the improvement which comprises carrying out the condensation in a reaction mixture containing an inert organic liquid having a boiling point not less than about 130° C. and selected from the group consisting of hydrocarbons of the aliphatic and aromatic series and their halogen derivatives, as an extender.

12. In the production of fluorescein by the condensation of o-phthalic anhydride with resorcinol, the improvement which comprises carrying out the condensation in an inert organic liquid in which the phthalic anhydride and resorcinol are soluble, said liquid having a boiling point of 165° to 195° C.

13. In the production of fluorescein by the condensation of o-phthalic anhydride with resorcinol, the improvement which comprises carrying out the condensation in an inert organic liquid in which the phthalic anhydride and resorcinol are soluble but in which fluorescein is substantially insoluble, said liquid having a boiling point of 165° to 195° C. and being included within the group consisting of the aromatic and aliphatic hydrocarbons and their halogen derivatives.

14. In the production of fluorescein by the condensation of o-phthalic anhydride with resorcinol, the improvement which comprises dissolving the phthalic anhydride and resorcinol in an inert organic liquid immiscible with water and having a boiling point of not less than 130° C., to form a solution having a boiling point of 160° to 190° C., boiling the solution to effect the condensation reaction, and adding said organic liquid to the reaction mixture to replace that lost by vaporization.

15. In the production of fluorescein by the condensation of o-phthalic anhydride with resorcinol, the improvement which comprises dissolving the phthalic anhydride and resorcinol in an inert organic liquid immiscible with water and having a boiling point of not less than 130° C., to form a solution having a boiling point of 160° to 190° C., boiling the solution to effect the condensation reaction, condensing vapors of the organic liquid evolved from the reaction mixture while permitting accompanying water vapor to pass off, and returning the organic liquid condensate to the reaction mixture.

16. In the production of fluorescein by the condensation of o-phthalic anhydride with resorcinol, the improvement which comprises dissolving the phthalic anhydride and resorcinol in dichlorobenzene, boiling the solution to effect the condensation reaction, condensing vapors of dichlorobenzene evolved from the reaction mixture while permitting water vapor to pass off, returning the condensed dichlorobenzene to the reaction mixture, and adding dischlorobenzene to the reaction mixture to maintain the reaction mixture mobile.

17. In the production of fluorescein by the condensation of o-phthalic anhydride with resorcinol, the improvement which comprises heating a mixture of 868 parts of o-phthalic anhydride, 1060 parts of resorcinol and 482 parts of dichlorobenzene at 185° C. to 190° C., condensing and refluxing vapors of dichlorobenzene evolved from the mixture while permitting water-vapor to pass off, adding two portions each of 482 parts of hot dichlorobenzene to the reaction mixture at intervals of two hours to replace that lost by vaporization, and filtering off the resulting fluorescein from the reaction mass at the completion of the reaction.

18. In the production of a polyhydroxyfluorane by the condensation of an o-phthalic compound with a polyhydroxybenzene compound containing a free position ortho to one of the hydroxyl groups, the step which comprises forming a reaction mixture containing the ophthalic anhydride compound, the polyhydroxybenzene compound, and an inert organic liquid as an extender.

19. In the production of a polyhydroxyfluorane by the condensation of an o-phthalic anhydride compound with a polyhydroxybenzene compound containing a free position ortho to one of the hydroxyl groups, the step which comprises forming a solution of the o-phthalic anhydride compound and the polyhydroxybenzene compound in an inert organic liquid in which the polyhydroxyfluorane produced is substantially insoluble.

20. In the production of fluorescein by the condensation of o-phthalic anhydride with resorcinol, the step which comprises forming a solution of the phthalic anhydride and resorcinol in dichlorobenzene.

PAUL B. WOODS.
JAMES OGILVIE.
FREDERICK H. KRANZ.